Patented July 14, 1953

2,645,291

UNITED STATES PATENT OFFICE 2,645,291

HYDRAULICALLY FRACTURING WELL FORMATION

Vanderveer Voorhees, Los Altos, Calif., assignor to Standard Oil Company, Chicago, Ill., a corporation of Indiana No Drawing. Application October 29, 1948, Serial No. 57,401

11 Claims. (Cl. 166—21)

This invention relates to the treatment of oil and gas wells. More particularly, the invention pertains to a method of increasing the productivity of wells by producing lateral drainage channels in selected formations traversed by the well.

In the art of increasing the productivity of oil and gas wells various methods have been proposed for increasing the drainage area within a selected producing zone. For example, explosives have been detonated in a well to enlarge the well diameter or to fracture the formations immediately adjacent the well. The use of explosives in this art, however, is restricted in many cases due to the presence of pipe in the hole, the expense, the hazards involved, and the uncertainty or uncontrolability of the process. Horizontal drilling likewise has been proposed for increasing the surface area of a well in a selected zone. This requires cumbersome apparatus, does not find general application, and the increased productivity is rarely commensurate with the increased cost of drilling. Furthermore, both of these processes are further limited by their inability to extend drainage channels or fractures any appreciable distance into the well formation. Acidizing is sometimes practiced to increase the premeability of the formations immediately adjacent a well, but this process is generally limited by practical consideration to use in calcareous formations and in general does not provide lateral drainage channels sufficiently extensive to be effective in many cases.

It has recently been proposed to hydraulically fracture formations adjacent a well by employing a viscose oily fluid that can be injected into the well at a pressure high enough to effect fracturing. If desired, the hydraulic fluid may have suspended therein a propping agent, such as sand, so that once a fracture is formed, it will be prevented from closing off and the fracture created will remain to serve as a producing flow channel. After the fracture is made, it is essential that the fracturing fluid be sufficiently non-viscous or thin so as to flow back out of the formation into the well since otherwise the viscous material will plug the fracture which has been formed. It is with respect to this latter feature that my invention is particularly directed.

Accordingly, it is an object of this invention to provide an improved method of completing or working over wells. Another object of the invention is to provide an improved composition for fracturing producing oil formations. A more specific object of my invention is to provide a method of hydraulically fracturing a formation penetrated by a well whereby a permeable channel is produced in the formation to conduct fluids from the formation into the well. These and other objects of my invention will become apparent as the description thereof proceeds.

In the present invention which is directed to the improved method of producing permeable channels to remote points in mechanically inaccessible formations, a viscous low-penetration liquid is produced by the addition to an oil of a water-soluble finely divided solid to form a low-liquid-loss slurry. These channels from remote points in a formation traversed by the well are created by application of hydraulic pressure to the low-liquid-loss slurry. To produce a fracture, I first place the low-penetration oil slurry in the well opposite the zone to be fractured. Pressure is then applied to the slurry and due to its retarded tendency to filter through the formation, a pressure is built up in the well sufficient to produce a fracture, generally along a horizontal bedding plane where the tensile strength of the rock is low. The application of the invention, however, is not limited to fracturing formations along a horizontal plane because in non-stratified formations the formation often appears to fracture along a vertical plane. In any case liquid is pumped into the well at a rate which causes the pressure to rise to the point that a fracture occurs. This pressure is indicated generally by a sharp break in the pressure after which the liquid may be injected into the well and the formation fracture without a substantial increase in pressure. When this condition has been reached, the slurry is removed by permitting the water-soluble salt to dissolve in water present in the formation or deliberately injected therein, thereby reducing or breaking the viscosity of the fluid.

I may employ as the viscous liquid a crude oil fraction available at the well or a distillate, such as gas oil, kerosene, or polymerized olefins, cracking still residues, etc. Similarly, non-petroleum oils, such as animal oil, lard oil, fish oil, or a vegetable oil, or mixtures of any of the above oils, may be used. Likewise, it is contemplated that chlorinated hydrocarbons or polymers, such as the arochlors, can be used as the slurrying liquid.

The finely divided solid suspended in the hydraulic fluid is a substance which is soluble in water or decomposable by water, such as a salt, preferably one which is commercially available at a low cost, for example common salt, sodium sulfate (either anhydrous or with water of crystallization), sodium bicarbonate, etc. It should be ground to a particle size of the order of 2 to 200, usually 10 to 100 microns. About 150 to 400 mesh is satisfactory. Ordinarily, about 1 to 5 pounds per gallon of water-soluble salt may be employed in the hydraulic fluid, although when heavy solids are used, such as lead chloride or barium chloride, larger amounts up to 8 or 10 pounds per gallon can be used.

Other highly water-soluble solids can be used, such as cane sugar, dextrose, ammonium salts, such as sulfate, carbonate, and nitrate, and mixtures of different water-soluble salts which are compatible and which do not form insoluble products in contact with oil or water.

The usual hydraulic fluid requirement is for an oil phase material with an apparent viscosity of between about 50 and 150 centipoises or higher. If desired, the slurry can be stabilized by the use of a small proportion of surface-active agents, such as sodium lauryl sulfate, Aerosol OT, mahogany soap, sulfonated castor oil, etc. For example, mahogany soap in proportions of about 1 to 10 percent based upon the crude oil has been employed as such stabilizer. About 5 percent mahogany soap in combination with powdered $Na_2SO_4$ was found effective. It is also contemplated that between about 1 and 5 volume percent of a soap bodying agent, preferably a metal soap such as an aluminum soap, may be added to the oil slurry of water-soluble solids. In general, the soaps or salts of fatty acids such as the laurates, naphthenates, oleates, and mixtures of such salts are contemplated. Other viscosity conferring agents, such as polybutene, aluminum stearate and rubber, both natural and synthetic, can be added.

Inasmuch as the slurry tends to obstruct the flow of fluids from the fractured formation into the well, it is removed therefrom after it has produced the fracture. A substance which acts primarily upon the water-soluble salts may be injected into the fracture following injection of the viscous liquid. Such a substance is water which dissolves the water-soluble solid suspended in the oil slurry. The resulting oil and salt solution is of low viscosity and can be withdrawn from the formation. In general, however, the viscosity may be substantially reduced by the interstitial aqueous fluids found in most formations. The breaking of the slurry by these means may require several days or weeks.

As mentioned above, props may be incorporated in the viscous liquid either during mixing or during the time it is being injected into the well. These props, for example sand, are suspended by the viscous slurry and carried into the formation fracture. Since these slurries have only a temporary high viscosity, i. e. since the high viscosity of the slurry is subsequently reduced within the fracture, the props are deposited from the fluid within the fracture and held in the formation as the fracture is collapsed. Thus, there is no tendency for the props to flow back into the well as the well is produced or as the hydraulic fracturing fluid is withdrawn into the well.

The method of using the oil slurries of water-soluble salts is to prepare the slurry, for example at the well head, employing sufficient solids to give the desired apparent viscosity for low liquid loss. This slurry is generally forced into the well through a heavy walled induction pipe leading to a point adjacent the horizon to be treated. Packers above and below the stratum can be used to retain the pressure, or cement plugs can be placed to be drilled out later. Sufficient pressure to drive the slurry into and fracture the formation is applied, e. g. 1000 to 15,000 p. s. i. After a lapse of time, for example 2 hours to 1 or 2 days, the water surrounding the fissures in the well is taken up by the slurry and dissolves the water-soluble solids to form a thin mixture of oil and saturated salt solution. This process is hastened by the osmotic pressure of the initially formed salt solution, the slurry having a dehydrating effect on the surrounding formation with which it is in contact. The effectiveness of the finely divided solid or suspensoid in preventing leakage of oil and loss of pressure to the formation can be further enhanced by using water-soluble solids prepared in the form of fine fibers, platelets, or needles.

A pumpable hydraulic fluid for fracturing deep earth formations may be compounded according to my invention by commingling with a normally liquid hydrocarbon about 1 to 10 pounds per gallon of a granular water-soluble salt having a particle size of about 150 to 400 mesh and about 1 to 10 percent of a dispersion stabilizer comprising essentially mahogany soap.

According to my preferred process a formation packer, either single or dual, is located and set in the well on the tubing to isolate and confine a selected producing zone which is to be fractured. The low-penetration slurry is first pumped into the well. This slurry, when it reaches the formation which is to be fractured, tends to stay in the well and build up a high pressure due to its inability to penetrate the formation. As pumping or injection of the slurry into the well continues after the slurry has reached the selected formation, the formation breakdown pressure is reached at which time, as a general rule, the surface pressure decreases abruptly and levels off at a substantially constant value upon the continued injection of the slurry. If desired, the fracture may be extended to substantially any distance. It is also contemplated that I may temporarily stop the injection and allow the slurry to set up or "gel" in the finer passages of the formation before again applying the fracturing pressure.

The pressure at which an abrupt pressure drop occurs is referred to as the "formation breakdown pressure" and is roughly equivalent in pounds per square inch at the formation fractured to the depth of such formation in feet. This pressure varies, however, from place to place depending upon depth and the nature of the formations, folding of the formations, and the like.

The low-penetration slurry may be followed by a filler, such as gasoline, which tends to displace the low-penetration slurry into the fracture. For example, I may employ from about 50 to about a thousand gallons or more of the low-penetration slurry and follow the slurry with gasoline or other filler to drive the low-penetration slurry a substantial distance further into the formation.

Although a specific embodiment of my invention has been described, it should be understood that this is by way of illustration only and that the invention is not limited thereto since alternative embodiments and operating conditions will become apparent to those skilled in the art. Accordingly, modifications of my invention are contemplated without departing from the spirit of my described invention or the scope of the appended claims.

I claim:

1. A method of increasing the productivity of a producing formation penetrated by a well bore which comprises disposing adjacent said formation a slurry of a water immiscible organic liquid and finely divided water-soluble and insoluble solid substances, said water-soluble substance having a particle size of about 150 to 400 mesh and in an amount of about 1 to 10 pounds per gallon of liquid, applying to said slurry a greater than formation breakdown pressure until at least a part of the slurry including said solid substances enters a produced fracture in the formation, subsequently dissolving the water-soluble substance in the said slurry within the fracture to produce a fluid of reduced viscosity and removing the fluid of reduced viscosity from said fracture to produce a highly permeable channel through said fracture extending from said formation into said well bore.

2. A method of increasing the productivity of a producing formation traversed by a well bore which comprises disposing adjacent said formation a water immiscible organic liquid containing a suspension of about 1 to 10 pounds per gallon of a finely divided water-soluble salt having a particle size of about 150 to 400 mesh, applying to said liquid a greater than formation breakdown pressure of about 1000 to 15,000 p. s. i. until a fracture is produced and at least a part of the liquid suspension of solids enters the formation through said fracture, subsequently decreasing the apparent viscosity of the suspension within the formation by commingling water therewith to form a water solution of the water-soluble substance, and removing the fluids from said formation to produce a high permeable channel in said formation communicating with said well bore.

3. The method of developing passages for liquids through an underground formation adjacent deep well bores which comprises injecting into said formation under high pressure of between about 1000 and 15,000 p. s. i., a slurry of finely divided water-soluble and water insoluble solids in oil thereby fracturing said formation, said water-soluble solids having a particle size of about 150 to 400 mesh and comprising about 1 to 10 pounds of solids per gallon of oil, retaining said slurry in said formation until said water soluble solids are substantially dissolved in water present in said formation and then withdrawing the solution of water-soluble solids and oil from said formation leaving the water insoluble solids within the formation to provide a permeable channel.

4. The method of increasing productivity of well fluids from a formation penetrated by a well, which method comprises introducing into the well a pumpable fracturing liquid having substantially retarded tendency to enter the formation traversed by the well, such fracturing liquid consisting essentially of a hydrocarbon oil and between about 1 and 5 pounds of finely divided water-soluble solids suspended in each gallon of said oil, the said finely divided water-soluble solids having a particle size of between about 100 and 400 mesh, pumping said fracturing liquid into the well until a column thereof is in contact with the formation, pumping an additional quantity of a liquid into the well as a follower for said column at a rate sufficient to increase the pressure exerted at the formation to between about 1000 to 15,000 p. s. i. and until a formation fracture is indicated by a decrease in the pressure at the pump discharge while pumping at an undiminished rate, said pressure in pounds per square inch corresponding approximately to the depth of the formation in feet from the surface, continuing the pumping after indication of the fracture to displace at least a part of the fracturing liquid from the column into passages formed and extended within the formation, maintaining the pressure on said fracturing liquid for a time sufficient for the fracturing liquid within the passages to adsorb water from the surrounding formation, whereby the water-soluble solids are dissolved in the adsorbed water and whereby the viscosity of the fracturing liquid in the said passages is substantially reduced, and withdrawing the follower liquid and the liquid of reduced viscosity including the water-soluble solids in the form of an aqueous solution from the produced passages by removing fluids from said well.

5. The method of claim 4 wherein the fracturing liquid also contains granular spacer material insoluble in the well fluids so that said material is carried thereby into said passages and remains in said passages when the liquid of reduced viscosity is withdrawn therefrom.

6. The method of increasing productivity of well fluids from a formation penetrated by a well bore, which method comprises introducing into the well bore a column of a pumpable fracturing liquid having a substantially retarded tendency to enter the formation transversed by the well bore, such fracturing liquid consisting essentially of a hydrocarbon oil having an apparent viscosity of between about 50 and 150 centipoises, and having suspended therein between about 0.5 and 10 pounds of finely divided water-soluble salts having a particle size of the order of 2 to 200 microns, pumping an additional quantity of liquid into the well bore as a follower for said column at a rate sufficient to increase the pressure exerted in the formation to between about 1000 and 15,000 p. s. i. and pumping at an undiminished rate until a formation fracture is indicated by a decrease in the pressure in the pump discharge, continuing the pumping after indication of the fracture to displace at least a part of the fracturing liquid from the column into the passages formed and extended within the formation, maintaining the pressure on said fracturing liquid within the passages for a substantial period of time while contacting with water, whereby the water-soluble salts are dissolved in the water and whereby the viscosity of the fracturing liquid within said passages is substantially reduced by the solution of the finely divided salts, and withdrawing the follower liquid and the liquid of reduced viscosity including the water-soluble salts in the form of saturated salt solution from the produced passages by removing fluids from said well bore.

7. The method of claim 6 wherein the water contacted with the finely divided salts within the passages is a portion of the connate fluids within the fractured formation.

8. The method of claim 6 wherein the water contacted with the fracturing liquid within the passages has been injected into the formation for dissolving the water-soluble salts.

9. The method of increasing the productivity of a producing formation penetrated by a well which comprises introducing into the well a slurry of water-soluble solids in a hydrocarbon oil having a viscosity not greater than about 150 centipoises, said solids having a particle size of about 2 to 200 microns and being employed in amounts of about 1 to 10 pounds per gallon of oil to reduce the penetrating quality of said oil, positioning the introduced slurry adjacent said formation, pumping an additional quantity of liquid into the well bore at a rate sufficient to increase the pressure exerted on the slurry adjacent the formation to between about 1,000 and 15,000 p. s. i. and sufficient to effect indication of formation fracture, continuing the pumping of liquid after indication of fracture to displace at least a part of the slurry from the well into passages formed by said fracture, contacting said slurry in said passages with water to convert said slurry to a fluid of reduced viscosity and removing the fluid of reduced viscosity from the passages to produce permeable channels extending from said formation into the well bore.

10. The method of claim 9 wherein said slurry contains about 1 to 10 weight per cent of mahogany soap based on said oil.

11. The method of claim 9 which includes the step of introducing sand into the well with said slurry whereby the introduced sand is carried into the passages by said slurry and retained in said passages as a prop when the liquid of reduced viscosity is withdrawn therefrom.

VANDERVEER VOORHEES.

References Cited in the file of this patent

UNITED STATES PATENTS

| Number | Name | Date |
|---|---|---|
| Re. 16,535 | Joseph | Jan. 11, 1927 |
| 1,382,337 | Bellis | June 21, 1921 |
| 1,513,371 | Campbell | Oct. 28, 1924 |
| 2,010,800 | Adams | Aug. 13, 1935 |
| 2,055,666 | Moore et al. | Sept. 29, 1936 |
| 2,354,570 | Benckenstein | July 25, 1944 |
| 2,379,516 | Garrison | July 3, 1945 |
| 2,596,845 | Clark | May 23, 1952 |

FOREIGN PATENTS

| Number | Country | Date |
|---|---|---|
| 471,637 | Great Britain | Sept. 8, 1937 |

OTHER REFERENCES

Bennett, The Chemical Formulary, vol. I, page 426, published 1933 by Van Nostrand Co., of New York.

Ellis, The Chemistry of Petroleum Derivatives, page 1029, published 1934 by The Chemical Catalog Co., Inc., of New York.